May 8, 1962

A. S. VOLPIN 3,033,223

AUTOMATIC SEALANT-LUBRICANT SUPPLY
FITTING FOR PRESSURE VESSELS

Filed March 25, 1959

Alexander S. Volpin
INVENTOR.

BY

ATTORNEY

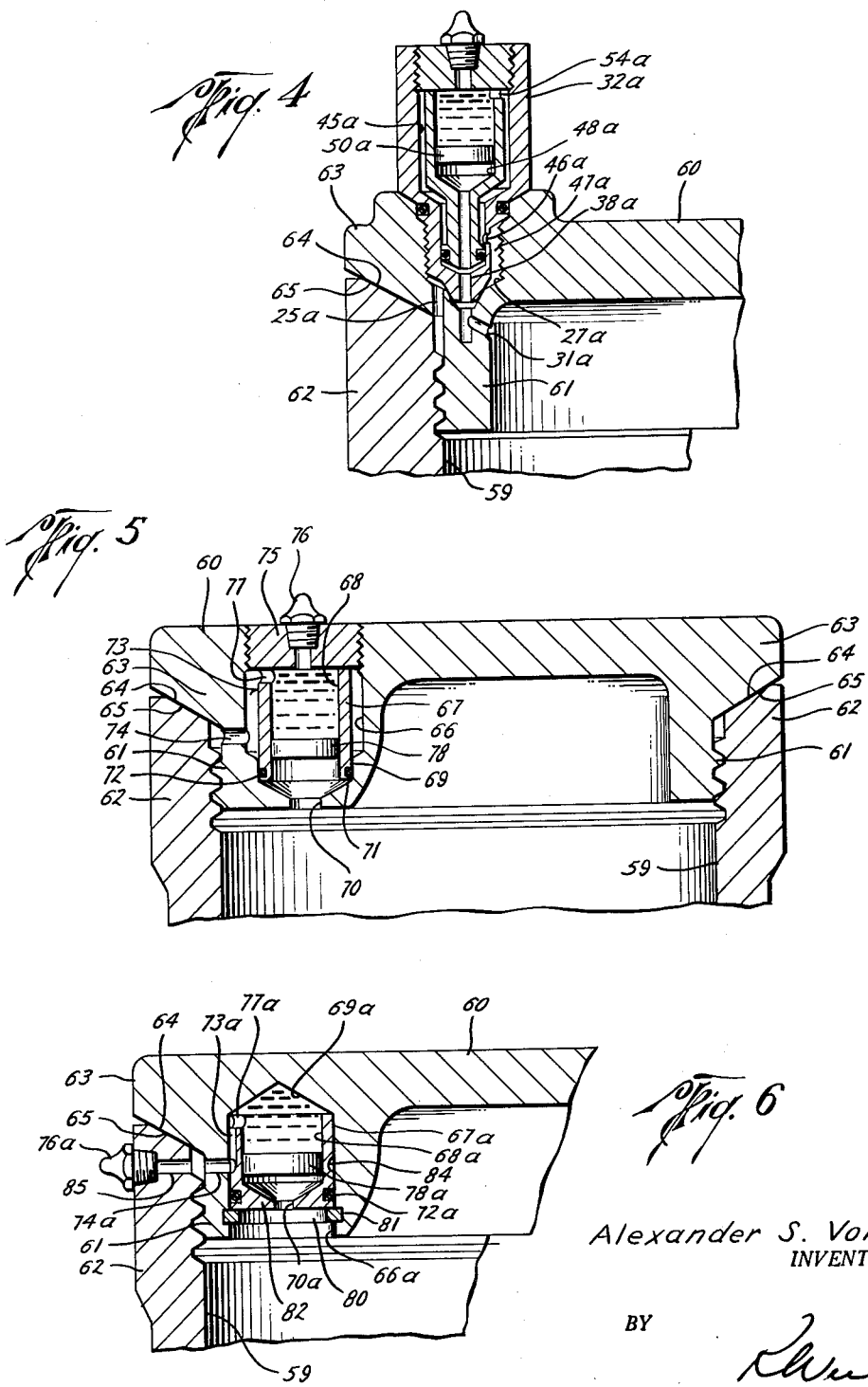

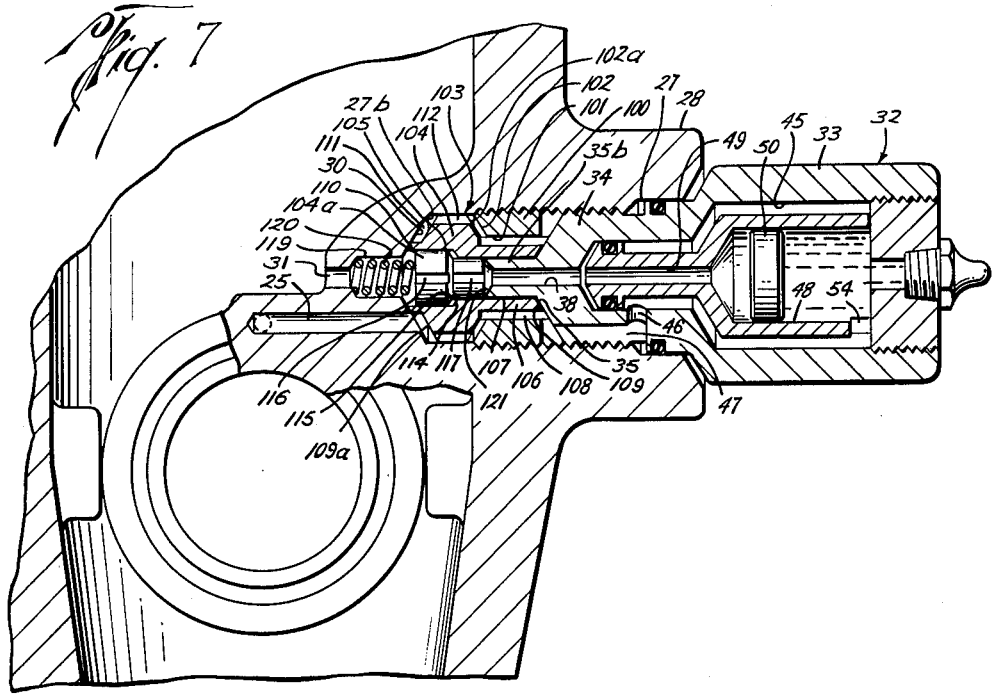
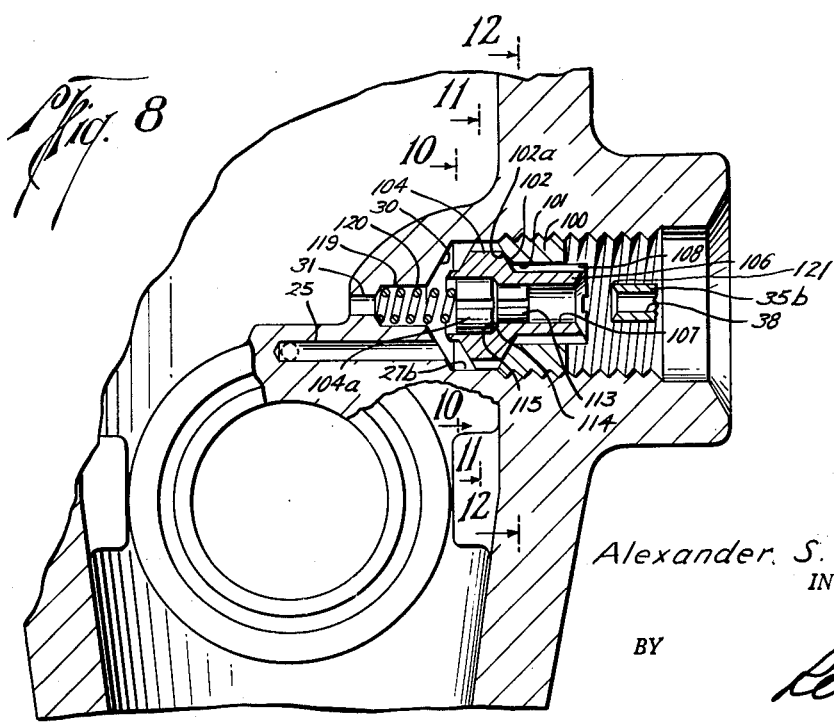

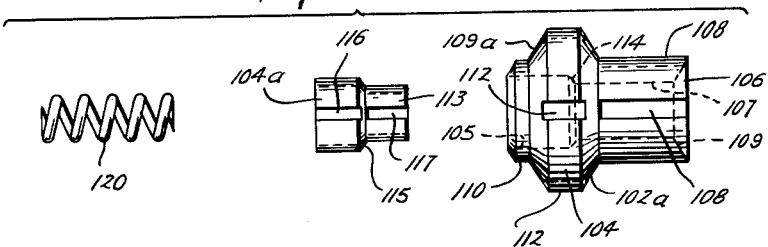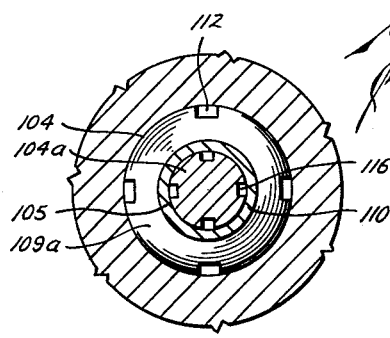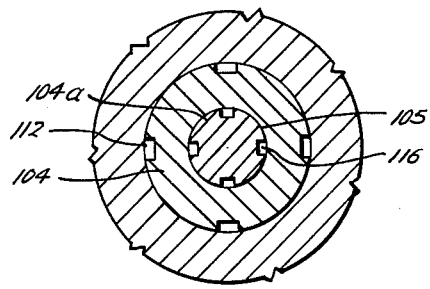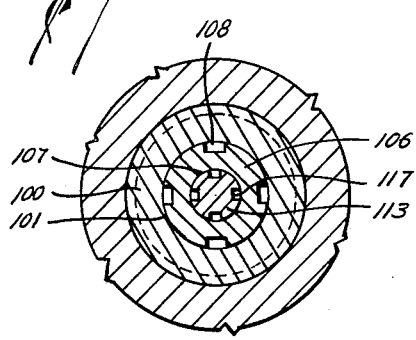
Alexander S. Volpin
INVENTOR.

United States Patent Office 3,033,223
Patented May 8, 1962

3,033,223
AUTOMATIC SEALANT-LUBRICANT SUPPLY
FITTING FOR PRESSURE VESSELS
Alexander S. Volpin, 10200 W. Broadview Drive,
Miami Beach, Fla.
Filed Mar. 25, 1959, Ser. No. 801,952
6 Claims. (Cl. 137—246.12)

This application is a continuation-in-part of my copending application, Serial No. 625,032, filed November 29, 1956, now abandoned.

This invention relates to the automatic lubricant sealing of closures employed to contain fluids under pressure in various types of pressure vessels, and more particularly to the automatic lubricant sealing of valve closures.

In present types of automatic lubricant-sealed valves, such as disclosed, for example, in my U.S. Patents Nos. 2,433,638, 2,657,898 and 2,660,397, the lubricant supply is contained in a pair of reservoirs positioned interiorly of the valve casing, each reservoir communicating with the sealing channels on one side of the valve closure, such as the valve gate, and being exposed to line pressure interiorly of the valve for feeding the lubricant to the sealing channels.

The provision of such reservoirs interiorly of the valve casing necessarily increases the over-all size and complexity of the valve construction with consequent increased cost of manufacture.

Accordingly, it is a primary object of the present invention to provide a lubricant-supply fitting which is adapted for external attachment to the wall of a pressure vessel and which is operable by fluid pressure from the interior of the vessel to automatically feed sealing lubricant to closure surfaces of the vessel.

An important object is the provision of a lubricant-supply fitting attachable to the exterior of a pressure vessel and embodying means operable in response to differentials in pressure across closure-sealing surfaces interiorly of the vessel to feed sealing lubricant to said surfaces.

A principal object is to provide a lubricant-supply fitting which is removably attachable to the exterior of a valve casing and operative by line pressure within the casing to automatically feed the lubricant to the sealing surfaces of the valve closure elements.

A further object is the provision of a lubricant-supply fitting attachable to the exterior of a valve casing, said lubricant fitting containing a lubricant reservoir and passages adapted to provide communication between the reservoir and areas of relatively high and relatively low pressure interiorly of the valve casing, and means operable by the resulting pressure differential across said reservoir to effect transfer of lubricant from said reservoir to said lower pressure area.

Another object is the provision of lubricant-supply fitting attachable to the exterior of a valve casing, said fitting containing a lubricant reservoir and having a first passage means for admitting line pressure from the interior of the valve casing to the reservoir, and a second passage means for conducting lubricant from said reservoir to a sealing area about the closure element of said valve in response to said line pressure.

Still another object is the provision of a lubricant-supply fitting adapted to be removably attached to the exterior of a valve casing, said fitting containing a lubricant reservoir, and a pair of passage means having communication with spaced points in said reservoir, one of said passage means being adapted to communicate with an area of relatively high pressure and the other with an area of relatively low pressure in said casing, and a barrier member in said reservoir movable therein between said spaced points.

Yet another object is the provision of a lubricant-supply fitting adapted to be removably attached to the exterior of a pressure vessel such as a valve casing, said fitting comprising a generally tubular body having an end connection member for attaching the fitting to the vessel wall, the body containing a lubricant reservoir, a pair of passages communicating at their inner ends with spaced portions of said reservoir and having both their outer ends opening through said end member, and a barrier member in the reservoir movable between the inner ends of said passages.

A further object is the provision, in combination with a gate valve having a sealing groove arrangement for lubricant sealing between the gate and gate seat surfaces, of a lubricant-supply fitting attachable to the exterior of the valve having means responsive to line pressure in the valve to automatically feed lubricant to said sealing groove arrangement.

In many instances it will be found highly desirable to be able to remove the sealant-supply fitting from the pressure vessel while the latter is under pressure, as when, for example, it may be desired to attach a reservoir of larger sealant-storage capacity, or when the fitting requires repair.

Accordingly, it is still another important object of this invention to provide a sealant-supply fitting of the general character described in association with valve means cooperably positioned in the valve or other pressure vessel to permit removal of the fitting while the vessel is under pressure.

An additional object is to provide dual co-axial check valve means arranged to individually control the line pressure passageway leading from the interior of the pressure vessel to the sealant reservoir in the fitting and the sealant-supply passageway leading from the sealant reservoir to the sealing groove system of the pressure vessel, both check valve means being normally outwardly-closing and cooperating with the sealant-supply fitting to be moved to their respective open positions by the attachment of the sealant-supply fitting to the pressure vessel.

Other and more specific objects and advantages of this invention will become more readily apparent when read in conjunction with the accompanying drawing which illustrates several useful embodiments in accordance with this invention.

FIGS. 4, 5 and 6 are fragmentary sectional views of lubricant-supply fittings in accordance with the present invention applied to a pressure vessel closure;

FIG. 7 is a fragmentary sectional view generally similar to FIG. 2, illustrating a modified arrangement employing check valve means in cooperation with the sealant-supply fitting to permit removal of the fitting while the valve is under pressure, the check valve parts being shown in the open positions occupied when the fitting is in place;

FIG. 8 is a view similar to FIG. 7, showing the check valve parts in their closed positions effected by removal of the sealant-supply fitting;

FIG. 9 is an exploded elevational view of the check valve elements; and

FIGS. 10, 11 and 12, are cross-sectional views taken respectively along lines 10—10, 11—11, and 12—12 of FIG. 8.

Figure 1:
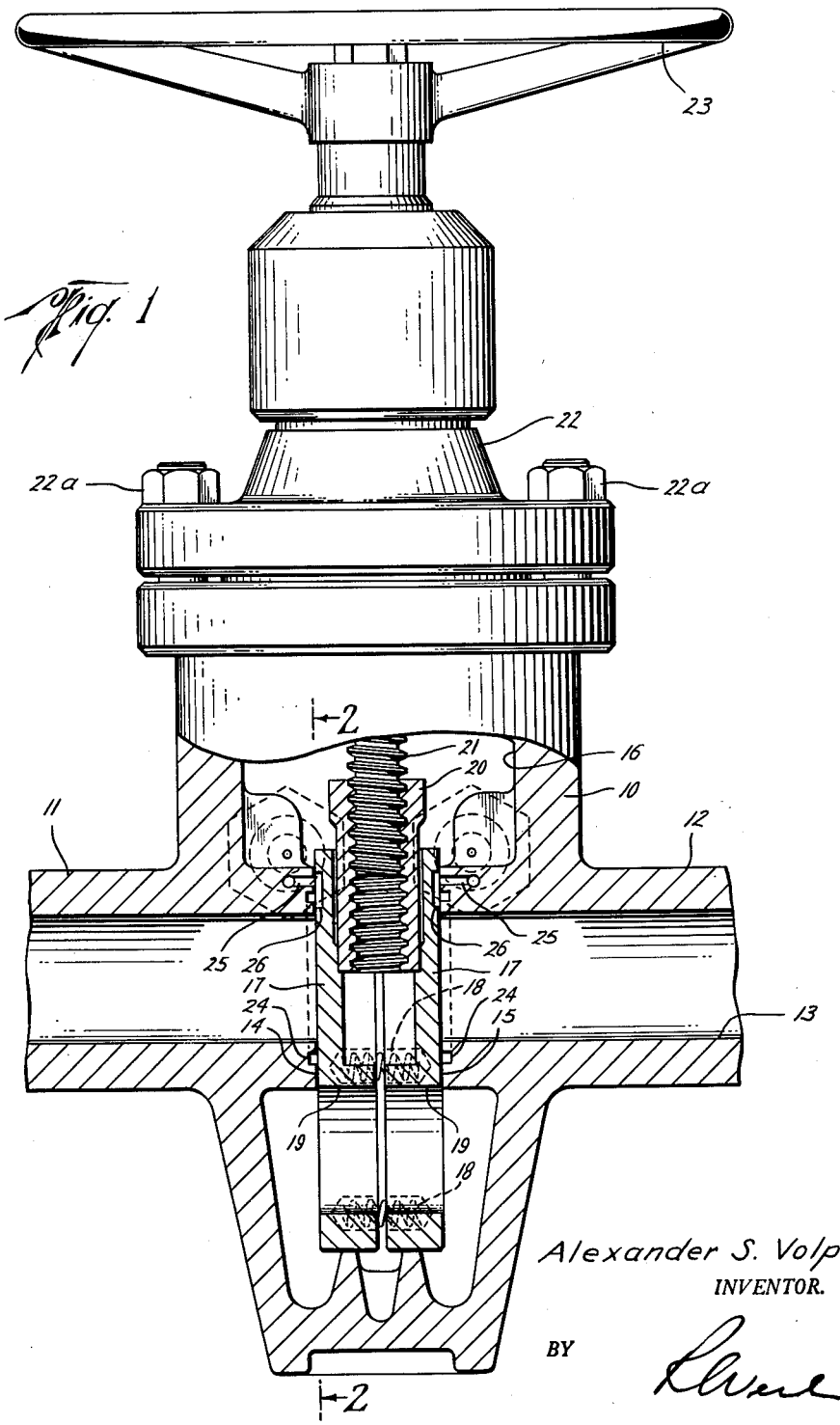
FIG. 1 is a view, partly in elevation and partly in transverse section, of a gate valve equipped with lubricant-supply fittings in accordance with the present invention.
Figure 2:
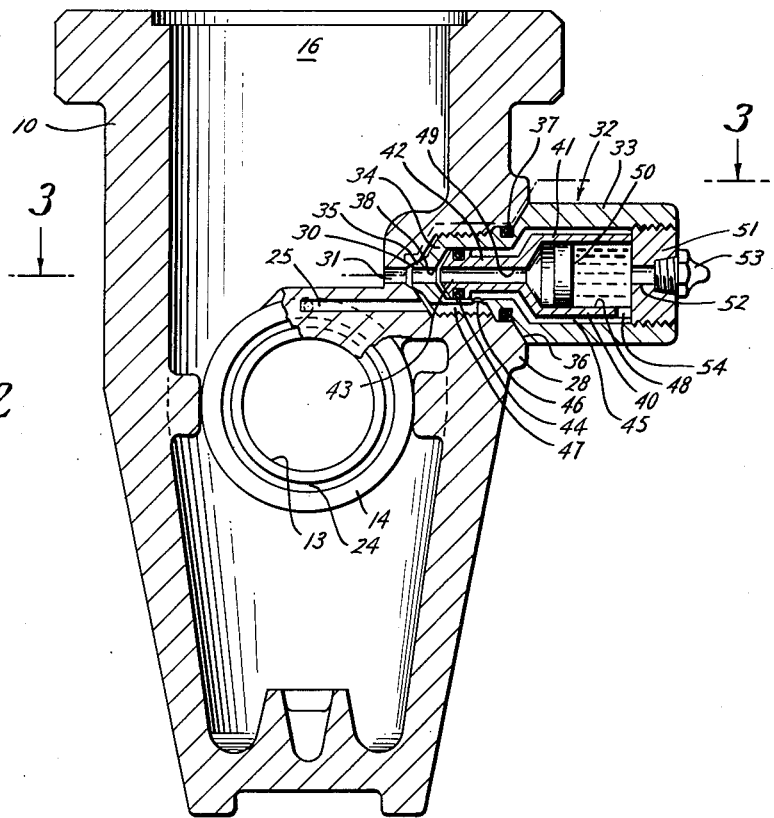
FIG. 2 is a vertical sectional view taken along line 2—2 of FIG. 1.
Figure 3:
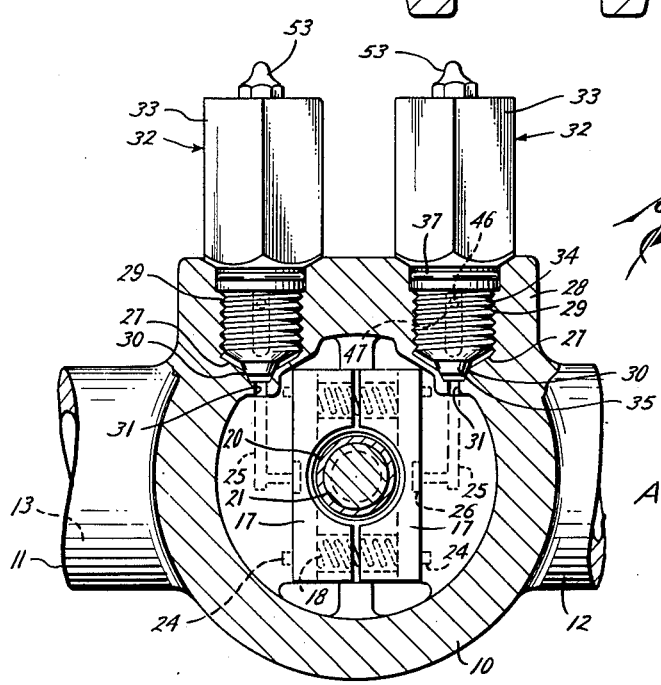
FIG. 3 is a transverse sectional view taken along line 3—3 of FIG. 2.

Referring to the drawing and more particularly to FIGS. 1 to 3, there is shown a through-conduit type gate valve of generally conventional form comprising the body 10 having opposed flow ports 11 and 12 forming the flowway 13 which is intersected interiorly of the valve body by the gate chamber 16, the inner ends of flow ports 11 and 12 defining the spaced apart opposed annular gate seats 14 and 15, respectively.

A gate comprising a pair of identical gate members 17—17 of generally flat, rectangular configuration, is disposed for verical movement between the seats 14, 15, the gate members being resiliently urged apart by springs 18—18 and into sliding engagement with the gate seats. The lower ends of the gate members are provided with registering transverse opening 19—19 forming a flow passage through the gate adapted to register with flowway 13 when the gate is in the raised or open position. A nut 20 is secured between the upper ends of the gate members and a gate stem 21 is threaded into the nut. The gate stem extends through a valve bonnet 22 in the usual manner and has its upper end connected to an operating wheel 23, the rotations of which serve to raise and lower the gate. Bonnet 22 is secured to the upper end of body 10 in any usual manner, as by means of bolts 22a, to close the gate chamber, and is provided with the usual seals and stuffing boxes (not shown) for the gate stem to seal the gate chamber against leakage of fluid passing through the valve.

Each of the seats 14 and 15 and the opposing outer faces of the adjacent gate members 17 are provided with a groove arrangement into which the sealant-lubricant is fed in order to seal between the downstream seat and gate member when the valve is in the closed position. These sealing groove arrangements may be of various forms and some suitable arrangements are illustrated in my afore-mentioned U.S. patents, the arrangement illustrated herein being one of the various forms of such arrangements which may be used. As illustrated, each seat is provided with a circular groove 24 surrounding flowway 13 and is also provided with a lubricant-supply passage 25 which opens to the seat face at a point radially spaced a short distance from groove 24. Each gate member is provided in its outer face with a small circular recess or channel 26 which is positioned in the face of the gate member to provide a communication channel between the end of passage 25 and groove 24 when the gate is in the closed position, as illustrated particularly in FIG. 1. Each of the supply passages 25 extends through the wall of body 10 into communication with the bottom of a socket 27 provided in the side wall of the body, there being two such sockets, preferably arranged in parallel, to serve the respective supply passages 25. The side wall of body 10 may be thickened to form a boss 28 to accommodate these soskets which are internally threaded at 29. The center of the bottom of each socket 27 communicates through a tapered seat 30 with a passage or channel 31 which communicates with gate chamber 16. Passage 25 communicates with the bottom of socket 27 at a point radially spaced from seat 30 (FIG. 2). A lubricant-supply fitting in accordance with one embodiment of this invention, designated generally by the numeral 32, is screwed into each of the sockets 27 to automatically supply sealant-lubricant to the respective sealing systems in a manner to be described hereinafter.

The fittings 32 are identical in construction and only one will be described in detail. The fitting comprises a generally tubular housing 33 which is reduced in diameter at one end to form a pin portion 34 which is externally threaded to be screwed into socket 27. The forward end of pin 34 is provided with a generally conical nose 35 which is adapted to be inserted in seat 30 and to seal tightly therewith. The reduction in diameter of housing 32 forms the annular shoulder 36 which may engage the outer rim of socket 27 when the fitting is screwed down into the socket. A seal ring 37 is provided about the base of pin portion 34 to seal with the wall of the socket. The inner end of pin portion 34 has an axial passage 38 which opens through nose portion 35 and is adapted to communicate with passage 31 when the fitting is screwed down into socket 27. The seal formed by the seating of nose portion 35 in seat 30 shuts off communication between passage 31 and the interior of socket 27 and thereby also from supply passage 25 which communicates with the interior of socket 27 at one side of seat 30, as previously noted. A generally tubular casing 40, somewhat smaller in external dimensions than the internal diameter of housing 33 and of the same general configuration, is concentrically positioned in the bore of housing 33. Casing 40 comprises the relatively large diameter outer portion 41 and a reduced diameter inner portion or neck 42 which extends into the bore of pin portion 34. The inner end of neck 42 is enlarged slightly to form a head 43 having a sliding fit with the inner end of the bore of pin portion 34, and is provided with an annular packing ring 44 to prevent leakage between the head 43 and the wall of the bore of pin portion 34. The difference in dimensions between casing 40 and housing 33 provides an annular channel 45 surrounding portions 41 and 42 of the casing and which communicates through a portion 46 in the wall of pin portion 34 with a longitudinal channel 47 cut in the exterior of pin portion 34 and opening into the bottom portion of socket 27. Port 46 and channel 47 thus provide a passageway through which communication is established between channel 45 and supply passage 25 by which lubricant is delivered to sealing groove 24. By means of the seal formed between nose 35 and seat 30 this system of passages is kept out of communication with the system of passages formed by channels 31 and 38 which provide communication between gate chamber 16 and the interior of the bore of nose portion 34 for admission thereto of line pressure from the interior of the valve. Outer portion 41 of casing 40 defines a reservoir 48, the bottom of which communicates through an axial passage 49 with channel 38. A piston member 50 is slidably mounted in reservoir 48 to form a movable barrier between axial passage 49 and the outer end of reservoir 48. The latter is closed by means of a screw plug 51 which is screwed into the end of housing 33 and against the outer end of casing 40. A lubricant injection passage 52 extends through plug 51 and has a conventional type of lubricant injection nozzle 53 mounted therein. A port 54 is provided through the wall of casing 40 near its outer end to provide communication between reservoir 48 on the outer side of barrier 50 and channel 45.

The lubricant-supply fitting 32 will ordinarily be made up as a unitary assembly and reservoir 48 will be filled with a suitable sealant-lubricant through injection nozzle 53 and the fitting may then be simply screwed into socket 27 to complete the means for automatic lubricant supply to the valve.

When the gate is closed, as shown in FIG. 1, the upstream line pressure, the direction of flow being indicated by the arrows in FIG. 1 for purposes of this description, will displace the righthand gate member slightly away from seat 15, allowing the line pressure to enter gate chamber 16. This line pressure will be admitted through passages 31, 38 and 49 to the inner side of barrier 50 in the sealant reservoir, and this line pressure will then act on the barrier 50 to move it outwardly and thereby force sealant-lubricant through port 54, channel 45, port 46, channel 47 and lubricant-supply passage 25 communicating with recess 26 and groove 24 between the downstream seat 14 and the adjacent gate member 17, this movement of sealant-lubricant being effected by the difference in pressure between the higher upstream line pressure in gate chamber 16 and the lower downstream pressure in the downstream flow port 11. It will be understood that if flow is reversed through the valve, the other lubricant fitting will be actuated in the same manner to lubricate the other gate and seat.

By the construction of the sealant-lubricant supply fitting, as described, it will be seen that it constitutes a compact unitary structure attachable to the exterior of the valve body and comprising a sealant reservoir provided with a pair of passages communicating with spaced points in the reservoir at one end and having their opposite ends opening through the terminal or connector element of the fitting for communication with areas in the valve of relative higher and lower pressures, whereby the resulting differential in pressure produced across the reservoir moves the barrier in the reservoir accordingly and forces lubricant into the downstream sealing system.

It will be evident that the described type of lubricant-supply fitting may be employed for feeding sealing material into closures of various forms in various types of pressure vessels, its application thus not being limited specifically to use on gate valves although the latter is a particularly useful application.

FIGS. 7 to 12, inclusive, illustrate a modified arrangement of the fitting and valve structure disclosed in FIGS. 1 to 3, described above, by which the fitting may be removed from the valve for repair or replacement while the valve is under full line pressure.

In this modification outwardly-closing check valve means of suitable form is installed in socket 27 and is adapted to be opened by insertion of the fitting in the socket and to automatically close-off both passages 31 and 25 when the fitting is removed from socket 27.

To accommodate the check valve means, socket 27 is deepened to receive a threaded seat bushing 100, having an axial bore 101 and a tapered annular seat 102 on its inner end. Between the threaded portion of socket 27 and the tapered bottom 30 of the socket, there is provided an unthreaded wall portion 27b in the socket. A dual co-axial check valve means, designated generally by the numeral 103 and shown in exploded view in FIG. 9, is mounted in the unthreaded portion 27b of socket 27 for movement axially of the socket.

Check valve means 103 comprises the outer larger diameter check valve 104 of generally annular shape having an axial bore 105, and a smaller diameter check valve 104a co-axially and slidably mounted in bore 105. The forward end of check valve 104 tapers rearwardly and radially outwardly to form the annular seating surface 102a which is complementary to seat 102 of the seat bushing and adapted when in contact with seat 102 to seal therewith. The forward end of valve 104 is provided centrally thereof with a forwardly extending cylindrical steam 106 adapted to project slidably through bore 101 of the seat bushing and having a bore 107 somewhat smaller in diameter than bore 105 and co-axial therewith. The forward end of stem 106 defines an inwardly and rearwardly tapering seating surface 109 which is adapted to seat against tapered nose 35 of pin 34 when the latter has been screwed fully into socket 27. The external periphery of stem 106 is provided with a plurality of circumferentially spaced longitudinal grooves 108 which extend from the forward end of stem 106 to the juncture of the latter with surface 102a.

The rearward or inner end of valve 104 is conically tapered to provide an end surface 109a which is generally parallel to bottom 30 and is provided with a rearwardly projecting annular flange 110 adapted to engage bottom 30 surrounding the end of passage 31 and to thereby hold the rearward end of valve 104 in spaced relation to bottom 30 to provide the space 111 therebetween, the bore of flange 110 forming a rearward extension of bore 105. A plurality of longitudinally extending circumferentially spaced grooves 112 are provided in the external periphery of valve 104 to provide communication between space 111 and grooves 108. Flange 110 is dimensioned and positioned so as to engage bottom 30 on a circle which is inside the point of communication of passage 25 with the interior of socket 27. Thus when flange 110 is in contact with bottom 30, communication is cut-off between passage 25 and passage 31, the latter being thus placed in communication with bore 105. It will be seen that when check valve 104 is in its rearward or open position, illustrated in FIG. 7, passage 25 will be in communication with space 111, grooves 112 and 108.

The difference in diameters between bores 105 and 107 defines the internal annular shoulder or seat 114 at the outer end of bore 105, seat 114 being conically tapered, as illustrated.

The smaller check valve 104a is reciprocally mounted in bore 105 of the larger check valve and is provided at its forward end with a forwardly projecting cylindrical stem 113 which is somewhat smaller in diameter than valve 104a and adapted to extend slidably into bore 107 of the larger check valve. The difference in the diameters of stem 113 and valve 104a defines at their juncture the annular shoulder 115 which is tapered to engage and seal with seat 114 when valve 104a has moved to its outward or closed position, as best seen in FIG. 8.

A plurality of circumferentially spaced longitudinal grooves 116 and 117 are provided in the periphery of inner check valves 104a and in stem 113, respectively, in order to provide communication between passage 31 and bore 107 when inner check valve 104a is in its inwardly retracted or open position, as seen in FIG. 7. The outer end portion of passage 31 is enlarged at 119 to receive a coil spring 120 which bears against the rearward end of inner check valve 104a to resiliently bias the latter outwardly so that shoulder 115 will be urged into seating contact with shoulder 114 in order to close-off communication between passages 31 and bore 107 in the larger check valve. The force of spring 120, when shoulders 115 and 114 are in engagement, will then be transmitted through the latter to the larger check valve 104 which will likewise be urged outwardly to bring seating surface 102a into engagement with seat 102 and thereby close-off communication between passage 25 and the portion of the interior of socket 27 which lies outwardly of seat bushing 100.

With the check valve arrangement described, it will be seen that, absent any opposing force, both check valves 104 and 104a will normally close outwardly, the larger or outer check valve 104 serving to close-off communication between passage 25 and the portion of socket 27 lying outwardly of seat bushing 100, while the smaller inner check valve 104a will close-off communication between passage 31 and the bore 107 of the larger check valve. Thus, no pressure fluid may escape from the interior of valve body 10 when both the check valves are in their respective closed positions.

Fitting 32 is modified very slightly for cooperation with the check valves in order to actuate the check valves to move them to the respective open positions when the fitting is inserted in socket 27. The modification consists of a central tubular extension 35b of nose 35 of the fitting, the latter being otherwise identical with that previously described. Extension 35b has a diameter such as to be slidably received in bore 107 of the larger check valve and is made concave or hollowed at its inner end to form the narrow annular rim 121, which is adapted to engage the outward end of stem 113 of the inner check valve adjacent its periphery, the length of extension 35b being such that when pin 34 of the fitting is screwed into socket 27 to a suitable depth, seat 109 on the outward end of stem 105 will be engaged by nose portion 35 and as the latter moves inwardly in socket 27, it will urge valve 104 inwardly against the resistance of spring 120, while at the same time, extension 35b will project into bore 107 to a sufficient depth to cause rim 121 to thrust against the end of stem 113 and urge the smaller check valve 104a inwardly sufficiently to move shoulder 115 rearwardly away from shoulder 114, these positions being illustrated particularly in FIG. 7.

With the fitting thus inserted in socket 27, it will be seen that both check valves will be in their open positions thereby permitting line pressure to pass through passages 31, 119, grooves 116 and 117, and thence through the concavity in the end of extension 35b into passage 38, from which the pressure will be conducted, as in the previously described embodiment, through passage 49 into the inner portion of reservoir 48 to urge barrier 50 toward the rearward or outer end of the reservoir. At the same time, opening of the larger check valve will provide communication between sealant delivery channel 47 and passage 25 through grooves 108, 112 and space 111, for transfer of sealant from the outer portion of the sealant reservoir to the groove system of the valve.

When fitting 32 is unscrewed from socket 27, nose 35 and extension 35b will be retracted from their engagement with the ends of stems 106 and 113, respectively, whereupon, the pressure of spring 120 will act first against the rearward end of inner check valve 104a and then through the resulting engagement of shoulders 114 and 115 to urge the larger check valve 104 against seat 102, thereby closing-off all communication through the line pressure and sealant-delivery passages between the interior and the exterior of the valve casing.

It will be seen that the check valves, constructed and arranged as described, when in open position, each independently defines a portion of the passageway system which it controls, while being also operable to seal-off the sealant-supply passageway from the line pressure passageway while both passageways are kept open for the transmission, respectively, of line pressure to the sealant reservoir, and of sealant from the reservoir to the groove system of the valve.

FIGS. 4, 5 and 6 illustrate modifications, as well as additional applications, of the automatic sealant-supply fitting herein disclosed.

In FIG. 4, a lubricant-supply fitting 32a generally identical with fitting 32, is employed to automatically feed sealant to the metal-to-metal joint in a screw-type closure commonly used on pressure vessels. In this embodiment, the screw closure 60 is provided with an externally threaded neck 61 adapted to screw into an internally threaded nozzle 62 which is connected to a pressure vessel (not shown) and is in open communication therewith through the bore 59 of the nozzle. Closure 60 has a peripheral flange 63 provided with a tapered sealing surface 64 engageable with a complementary surface 65 on the outer end of nozzle 62. Fitting 32a is screwed into an internally threaded socket 27a provided in closure 60 adjacent flange 63 and opening to the exterior of the closure. The latter is provided with a channel 31a through which communication is established through passage 38a between bore 59 of nozzle 62 (and thus with the pressure in the connected pressure vessel) and reservoir 48a behind movable barrier 50a to thereby admit pressure from the pressure vessel to the reservoir and to thus displace the lubricant through port 54a, annular channel 45a, port 46a, channel 47a into a supply channel 25a provided in closure 60 and which communicates with the joint formed between the surfaces 64 and 65, into which the lubricant will be fed by the difference in pressure existing exteriorly of the joint as compared with that inside the vessel.

FIG. 5 illustrates an embodiment of a supply fitting, altered slightly in the over-all form from that shown in FIGS. 1 to 4 to automatically supply sealant to the joint in a screw closure of the type described above in connection with FIG. 4.

In this embodiment, closure 60 is provided with a recess or socket 66 opening to its outer surface and adapted to receive the casing 67 enclosing the sealant reservoir 68. The bore of socket 66 is reduced somewhat in diameter near its inner end at 69 and is again reduced at its inner end to form the passage 70 providing communication between the interior of nozzle 62 and the bottom of socket 66. The second reduction in diameter, forming the passage 70, provides the shoulder 71 against which the inner end of casing 67 is seated, the inner end of casing 67 being provided with an external sealing ring 72 adapted to form a fluid-tight seal with the wall of the reduced diameter portion 69. The external diameter of casing 67 is made smaller than the internal diameter of socket 66 to provide the annular channel 73 which communicates through a lateral passage 74 with a point adjacent the inner end of the joint formed by the surfaces 64 and 65. A screw plug 75, provided with a grease injector fitting 76, is screwed into the outer end of socket 66 against the outer end of casing 67 to form a closure therefor and to provide means for introducing sealant into reservoir 68. A port 77 is provided in the wall of casing 67 near its outer end whereby to place reservoir 68 into communication with annular channel 73. A movable barrier 78 is slidably mounted in reservoir 68, one side thereof being exposed to pressure entering socket 66 through channel 70 and the other side forming a barrier and piston for moving lubricant from the reservoir into channel 73 in response to the difference in pressure between the interior of the nozzle 62 and the exterior of the joint between the closure and the nozzle. With this arrangement, it will be seen that the difference in pressure will automatically feed sealant-lubricant from the reservoir to the joint between the surfaces 64 and 65.

FIG. 6 illustrates a modification of the embodiment illustrated in FIG. 5, in that closure 60 is provided with a recess or socket 66a opening to its inner surface and adapted to receive the cylindrical casing 67a enclosing the sealant reservoir 68a. The bottom 69a of socket 66a forms a seat for the inner end of casing 67a which is held in place in the socket by means of a snap ring 80 which seats in a ring groove 81 provided in the wall of socket 66a. An external sealing ring 72a is provided about the inner end of casing 67a to form a fluid-tight seal with the wall of socket 66a. A passage 70a is provided through the wall 82 closing the inner end of casing 67a to provide communication between the interior of reservoir 68a and bore 59 of the nozzle. The movable barrier 78a is provided in reservoir 68a and the latter is provided with an outlet port 77a through the wall of casing 67a near its outer end.

Port 77a communicates with one end of a longitudinal channel 73a cut in the exterior of casing 67a, the opposite end of channel 73a communicating with a circumferential channel or groove 84 provided in the exterior of casing 67a. Groove 84 communicates with a lateral passage 74a which leads through the wall of neck 61 to a point adjacent the inner end of the joint formed by the surfaces 64 and 65. A grease injector fitting 76a is screwed into the outer wall of nozzle 62 and communicates through a passage 85 with passage 74a whereby a supply of lubricant can be injected via passage 74a, channel 73a and port 77a into reservoir 68a.

As in the previously described embodiments, it will be seen that the difference between the pressure interiorly of nozzle 62 and that outside the nozzle will automatically feed sealant lubricant from reservoir 68a to the joint between surfaces 64 and 65.

It will be understood that numerous modifications and alterations may be made in the details of the several embodiments herein illustrated and described, but it will be seen that the present invention provides a nozzle-type of lubricant-supply fitting which may be installed externally of many types of pressure vessels and which may be caused to operate automatically in response to line pressure within the vessel to automatically feed sealant-lubricant to the joints or closure surfaces employed to contain pressure fluids in the vessels.

Additionally, in accordance with the embodiment illustrated in FIGS. 7 to 12, inclusive, means are provided to enable the fitting to be removed while the pressure vessel to which it is attached is under pressure. While FIGS. 7 to 12 illustrate this embodiment as applied to a gate valve, it will be readily apparent to those skilled in this art, that the embodiments illustrated particularly in FIGS. 4 and 5 may be correspondingly modified to permit removal of the sealant-supply fittings while the related pressure vessels are under pressure.

It will be understood that numerous changes and modifications may be made in the details of the illustrative embodiments within the scope of the appended claims but without departing from the spirit of this invention.

What I claim and desire to secure by Letters Patent is:

1. A sealant-supply fitting for attachment to the exterior of a vessel which is to receive sealant from the fitting, comprising a hollow body having a generally cylindrical bore, means on one end portion of the body for attaching the body to the vessel, means for closing the opposite end of said body, a passage through said one end portion communicating with the bore of the body, a generally tubular sleeve member removably disposed in the bore of the body and concentric therewith to define an annular space between the wall of said bore and the sleeve member, said sleeve member having a chamber interiorly thereof defining a sealant reservoir, a first passageway in said sleeve member providing communication between one end of said chamber and said passage, a second passageway in said sleeve member communicating with the opposite end of said chamber and opening to the exterior of said body through said one end portion, a barrier member slidable in said chamber between the points of communication of said passageways with said chamber, means forming a circumferential seal for said annular space intermediate the points of communication of said passageways with said chamber, and means for introducing sealant into said chamber from the exterior of said body.

2. A sealant-supply fitting for attachment to the exterior of a vessel which is to receive sealant from the fitting, said fitting comprising a housing having a generally cylindrical bore, means on one end portion of the housing for attaching the housing to the vessel, means closing the opposite end of said housing, a passage through said one end portion communicating with the bore of said housing, a generally tubular casing disposed in the bore of said housing and concentric therewith to define an annular channel between the wall of the bore and the exterior of the casing, said casing having a chamber interiorly thereof defining a sealant reservoir, a first passageway in said casing providing communication between one end of said chamber and said passage, a second passageway in said casing communicating with the opposite end of said chamber and opening to said annular channel, a barrier slidable in said chamber between the points of communication of said first and second passageways with said chamber, a second channel communicating with said annular channel and opening to the exterior of said housing at said one end portion thereof, and means sealing said annular channel intermediate said first passageway and said second channel.

3. A sealant-supply fitting for attachment to a vessel having an opening in a wall thereof for reception of one portion of the fitting in communication with the interior of the vessel which is to receive sealant from the fitting, said vessel having an opening in a wall thereof, said fitting comprising a housing having a generally cylindrical bore closed at its outer end, means on the housing for attaching the housing to the vessel, a passage through said one portion of the housing communicating with the inner end of the bore of said housing, a generally tubular casing disposed in the bore of said housing and concentric therewith to define an annular channel between the wall of the bore and the exterior of the casing, said casing having a chamber interiorly thereof defining a sealant reservoir, a first passaegway in said casing providing communication between the inner end of said chamber and said passage, a second passageway in said casing communicating with the outer end of said chamber and opening to said annular channel, a barrier slidable in said chamber between the points of communication of said first and second passageways with said chamber, a second channel communicating with said annular channel and opening to the exterior of said housing in said one portion thereof, and means sealing said annular channel intermediate said first passageway and said second channel.

4. In combination with a vlave including a casing having a flowway therethrough, an operable closure member for said flowway, and a sealant groove system completely surrounding said flowway when the closure member is in flowway-closing position, said groove system being adapted when filled with sealant to seal about said flowway, a pair of casing passageways having their inner ends communicating respectively with said groove system and with an area in the valve casing exposed to line pressure, the opposite ends of said passageways extending toward the exterior of said valve casing, a pair of outwardly-closing check valve means controlling the respective passageways, a sealant-supply fitting exteriorly attachable to said casing, said fitting comprising a body enclosing a sealant reservoir, a barrier slidable in the reservoir, a pair of fitting passages communicating at one end with the reservoir on opposite sides of said barrier, the opposite ends of said fitting passages being disposed so as to communicate with the respective passageways in the vlave casing when said fitting is attached to the valve, and means responsive to the attachment of the fitting to the valve casing to move both said check valve means to their open positions whereby to place said fitting passages in open communication respectively with said area in the valve casing exposed to line pressure and with said sealant groove system in said vlave.

5. In combination with a valve including a casing having a flowway therethrough, an operable closure member for said flowway, and a sealant groove system completely surrounding said flowway when the closure member is in flowway-closing position, said groove system being adapted when filled with sealant to seal about said flowway, a pair of casing passageways having their inner ends communicating respectively with said groove system and with an area in the valve casing exposed to line pressure, the opposite ends of said casing passageways merging into a single enlargement in the wall of the casing, a pair of outwardly-closing check valve means mounted in said enlargement and controlling the respective passageways, a sealant-supply fitting attachable to said enlargement, said fitting comprising a housing enclosing a sealant reservoir, a barrier slidable in the reservoir, a pair of passages communicating at one end with the reservoir on opposite sides of said barrier and having their opposite ends positioned to communicate with the respective passageways in the valve casing, and means operable by the attachment of the fitting into said enlargement to move both said check valve means to their open positions whereby to place said passages in open communication respectively with said area exposed to line pressure and with said groove system.

6. In combination with a valve including a casing having a flowway therethrough, an operable closure member for said flowway, and a sealant groove system completely surrounding said flowway when the closure member is in flowway-closing position, said groove system being adapted when filled with sealant to seal about said flowway, a pair of casing passageways having their inner ends communicating respectively with said groove system and with an area in the valve casing exposed to line pressure, a fitting receptacle in the wall of the casing opening to the exterior thereof, the opposite ends of said passageways communicating with the interior of the receptacle, an annular valve seat in said receptacle, a pair of concentrically arranged, outwardly-closing check valve means mounted in the receptacle cooperating with said seat and with each other to control the respective passageways, a sealant-supply fitting insertible into said receptacle, said fitting comprising a housing enclosing a sealant reservoir, a barrier slidable in the reservoir, a pair of passages communicating at one end with the reservoir on opposite sides of said barrier and having their opposite ends positioned to communuicate with the respective passageways in the valve casing, and means on the fitting operable by the insertion of the fitting into the receptacle to move both said check valve means to their open positions whereby to place said passages in open communication respectively with said area exposed to line pressure and with said groove system.

References Cited in the file of this patent

UNITED STATES PATENTS

| | | | |
|---|---|---|---|
| 746,837 | Homard | Dec. 15, | 1903 |
| 1,104,178 | Fleming | July 21, | 1914 |
| 1,400,647 | Westinghouse | Dec. 20, | 1921 |
| 1,403,756 | Farmer | Jan. 17, | 1922 |
| 1,984,422 | Nell | Dec. 18, | 1934 |
| 2,187,926 | Aukman | Jan. 23, | 1940 |
| 2,299,517 | Volpin | Oct. 20, | 1942 |
| 2,881,785 | Dotter | Apr. 14, | 1959 |